United States Patent
Lukacs et al.

(10) Patent No.: US 10,043,005 B2
(45) Date of Patent: Aug. 7, 2018

(54) SYSTEMS AND METHODS FOR APPLICATION CONTROL IN VIRTUALIZED ENVIRONMENTS

(71) Applicant: Bitdefender IPR Management Ltd., Nicosia (CY)

(72) Inventors: Sandor Lukacs, Floresti (RO); Andrei V. Lutas, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 142 days.

(21) Appl. No.: 15/086,490

(22) Filed: Mar. 31, 2016

(65) Prior Publication Data

US 2017/0286673 A1    Oct. 5, 2017

(51) Int. Cl.
| | | |
|---|---|---|
| G06F 21/00 | (2013.01) | |
| G06F 21/55 | (2013.01) | |
| G06F 21/51 | (2013.01) | |
| G06F 9/455 | (2018.01) | |
| G06F 21/56 | (2013.01) | |

(52) U.S. Cl.
CPC ........ *G06F 21/554* (2013.01); *G06F 9/45558* (2013.01); *G06F 21/51* (2013.01); *G06F 21/566* (2013.01); *G06F 2009/45587* (2013.01); *G06F 2221/033* (2013.01)

(58) Field of Classification Search
CPC .... G06F 21/554; G06F 21/51; G06F 9/45558; G06F 21/566; G06F 2221/033; G06F 2009/45587
See application file for complete search history.

(56) References Cited

U.S. PATENT DOCUMENTS

| | | | | |
|---|---|---|---|---|
| 4,410,940 | A | * | 10/1983 | Carlson ................. G06F 9/4881 718/106 |
| 5,652,854 | A | | 7/1997 | Wong |
| 6,973,578 | B1 | | 12/2005 | McIchionc |
| 7,496,575 | B2 | * | 2/2009 | Buccella ............... G06F 21/552 |
| 8,091,133 | B2 | | 1/2012 | Kim et al. |
| 8,683,576 | B1 | | 3/2014 | Yun |

(Continued)

OTHER PUBLICATIONS

Garfinkel et al., "A Virtual Machine Introspection Based Architecture for Intrusion Detection," NDSS. vol. 3. 2003, San Diego, CA, USA, Feb. 2003.

(Continued)

*Primary Examiner* — Don G Zhao
(74) *Attorney, Agent, or Firm* — Law Office of Andrei D Popovici, PC

(57) ABSTRACT

Described systems and methods enable enforcing application control remotely and automatically, on a relatively large number of client systems (e.g., a corporate network, a virtual desktop infrastructure system, etc.). An application control engine executes outside a virtual machine exposed on a client system, the application control engine configured to enforce application control within the virtual machine according to a set of control policies. When a policy indicates that a specific process is not allowable on the respective client system, the app control engine may prevent execution of the respective process. To assist in data gathering and/or other activities associated with application control, some embodiments temporarily drop a control agent into the controlled virtual machine.

17 Claims, 10 Drawing Sheets

(56) References Cited

U.S. PATENT DOCUMENTS

| | | | |
|---|---|---|---|
| 8,782,642 B2 | 7/2014 | Pope et al. | |
| 8,868,750 B2 | 10/2014 | Matsui | |
| 2003/0167421 A1* | 9/2003 | Klemm | G06F 9/3861 714/37 |
| 2012/0254993 A1 | 10/2012 | Sallam | |
| 2015/0095788 A1* | 4/2015 | Thiele | G06F 3/04817 715/735 |
| 2015/0248554 A1* | 9/2015 | Dumitru | G06F 21/53 726/1 |
| 2016/0036859 A1* | 2/2016 | Zaitsev | G06F 21/78 726/1 |
| 2016/0330286 A1* | 11/2016 | Keith | H04L 67/28 |
| 2017/0177909 A1* | 6/2017 | Sarangdhar | G06F 9/4401 |

OTHER PUBLICATIONS

McAfee, "McAfee Application Control", https://web.archive.org/web/20150413112443/http://www.mcafee.com/us/resources/datasheets/ds-application-control.pdf, McAfee, Part of Intel Security, CA, USA, Apr. 2015.

* cited by examiner

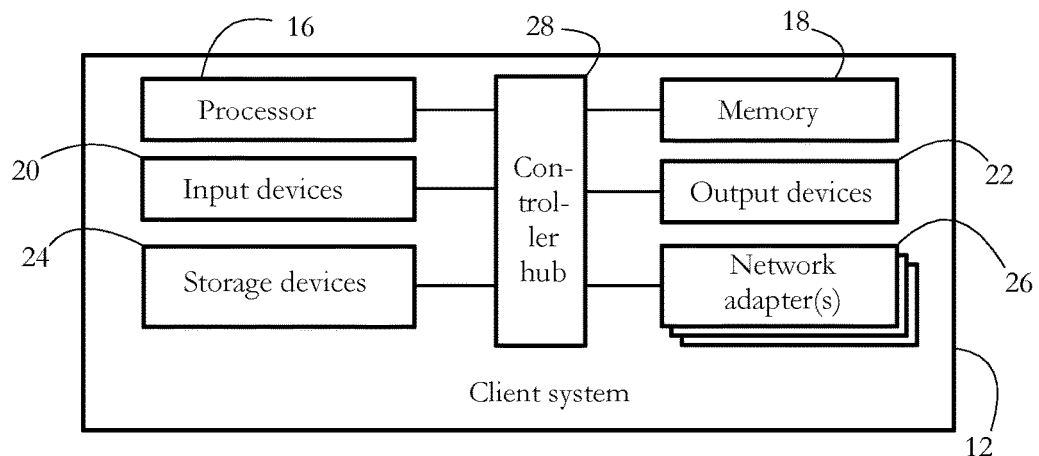
FIG. 2-A
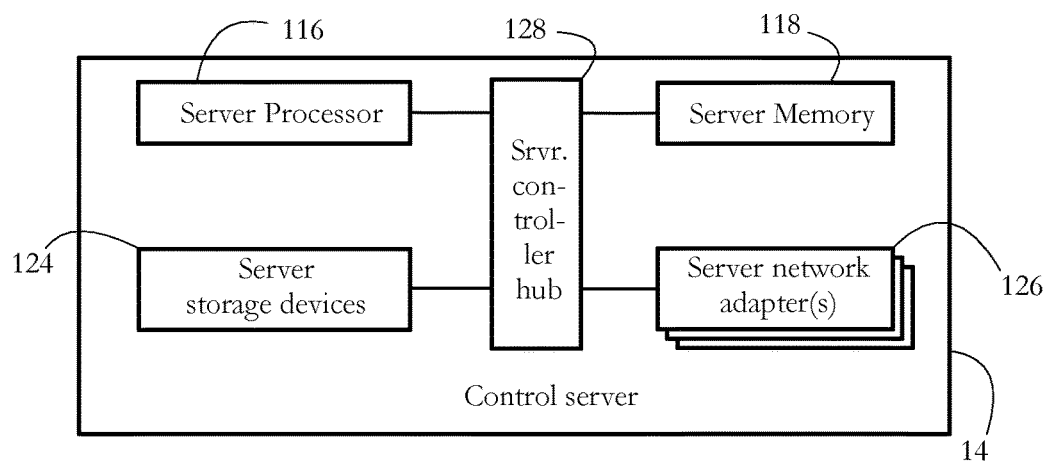
FIG. 2-B

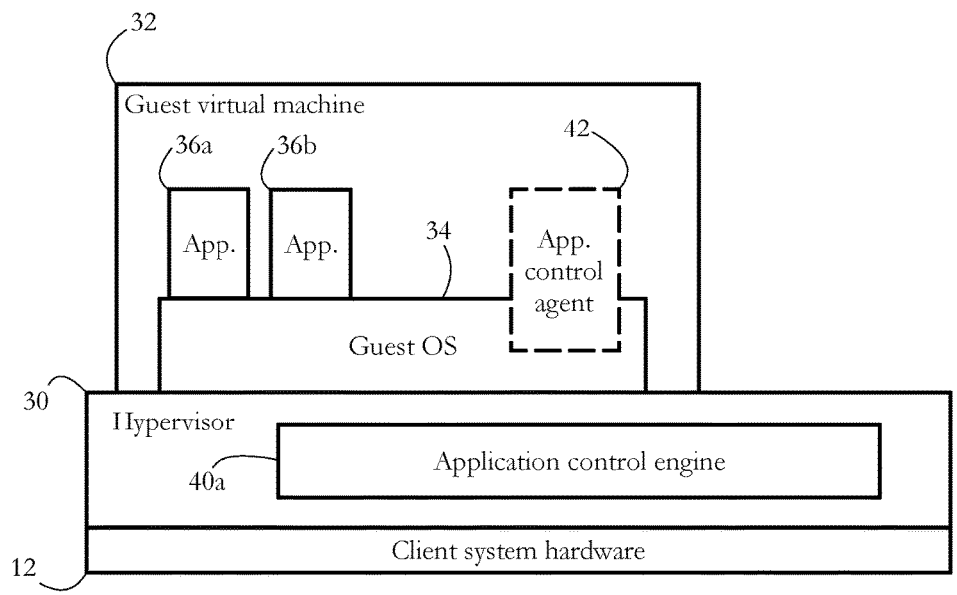
FIG. 3-A
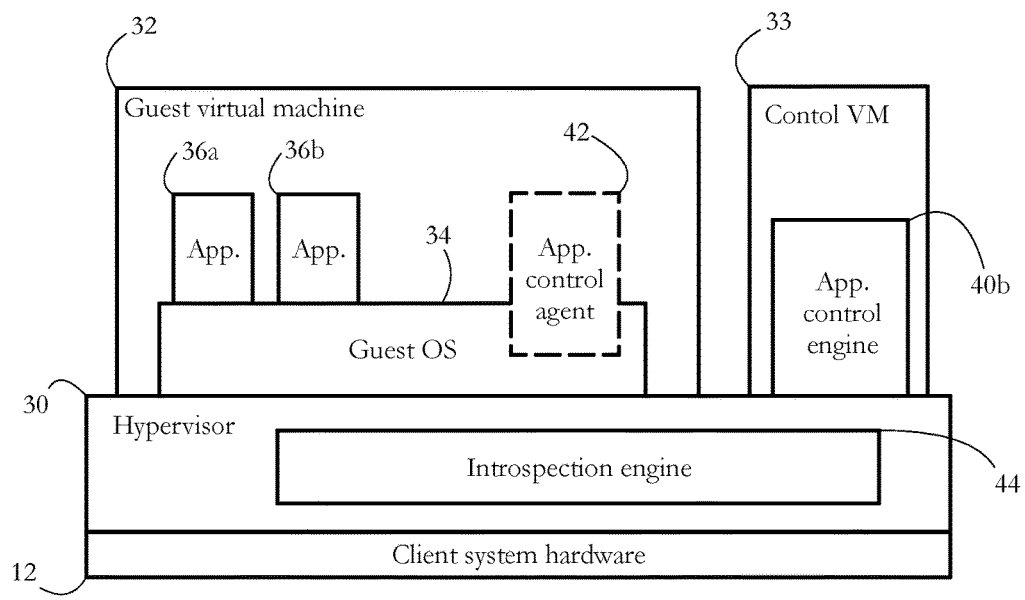
FIG. 3-B

SYSTEMS AND METHODS FOR APPLICATION CONTROL IN VIRTUALIZED ENVIRONMENTS

BACKGROUND

The invention relates to systems and methods for preventing a computer system from executing unauthorized software, and in particular, to carrying out such application control in hardware virtualization configurations.

In the modern software-driven economy, as employees move from using desktop computers to using mobile devices such as laptops, tablet computers, and mobile phones, and as work becomes progressively de-localized, managing an ever-increasing count and heterogeneity of software applications becomes a serious problem. Furthermore, running certain applications (such as instant messaging, social networks, and online games, among others) while at work may reduce employee productivity and expose a company to a substantial computer security risk from malicious software, spyware, and unauthorized intrusion.

A further recent development challenging the classical model of computing is hardware virtualization, which allows the creation of emulated computer environments commonly known as virtual machines (VM). In typical applications such as webserver farming and virtual desktop infrastructure (VDI), multiple virtual machines run simultaneously on the same physical machine, sharing the hardware resources among them, thus reducing investment and operating costs. Each virtual machine may run its own operating system and/or software applications, separately from other VMs. In some systems, virtual machines are instantiated and removed dynamically, which further increases the heterogeneity of software executing at any one time on the respective physical platform.

Application control software may be used to prevent a computer system and/or a user from executing any software apart from a selected subset of computer programs. In some forms, application control may further comprise allowing a computer system/user access only to a specific subset of services (protocols) and/or to specific subset of hardware devices (e.g., network ports, storage devices, etc.). There is an increasing interest in developing application control systems and methods particularly suited to modern virtualized environments.

SUMMARY

According to one aspect, a computer system comprises at least one hardware processor configured to execute a set of guest virtual machines (VM) and to further execute an application control engine, the application control engine executing outside the set of guest VMs. The application control engine is configured to detect an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process. The application control engine is further configured, in response to detecting the event, to determine according to an application control policy whether the target process is allowed to execute on the computer system, wherein the application control policy maps allowed processes to users of the computer system. The application control engine is further configured, in response to determining whether the target process is allowed to execute, when the target process is not allowed to execute, to prevent an execution of the target process.

According to another aspect, a method comprises employing at least one hardware processor of a client system to execute an application control engine outside of a set of guest virtual machines (VM) exposed on the client system. Executing the application control engine comprises detecting an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process. Executing the application control engine further comprises, in response to detecting the event, determining according to an application control policy whether the target process is allowed to execute on the client system, wherein the application control policy maps allowed processes to users of the client system. Executing the application control engine further comprises, in response to determining whether the target process is allowed to execute, when the target process is not allowed to execute, preventing an execution of the target process.

According to another aspect, a server computer system comprises at least one hardware processor configured to receive from a client system an indicator of a target process, and in response, transmit an application control policy to the client system, the application control policy mapping computer programs to users of the client system. The client system is configured to execute a set of guest virtual machines (VM) and to further execute an application control engine, the application control engine executing outside the set of guest VMs. The application control engine is configured to detect an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process. The application control engine is further configured, in response to detecting the event, to determine according to the application control policy whether the target process is allowed to execute on the computer system. The application control engine is further configured, in response to determining whether the target process is allowed to execute, when the target process is not allowed to execute, to prevent an execution of the target process.

According to another aspect a non-transitory computer-readable medium stores instructions which, when executed by at least one hardware processor of a computer system configured to execute a set of guest virtual machines (VM), cause the computer system to execute an application control engine, the application control engine executing outside the set of guest VMs. The application control engine is configured to detect an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process. The application control engine is further configured, in response to detecting the event, to determine according to an application control policy whether the target process is allowed to execute on the computer system, wherein the application control policy maps allowed processes to users of the computer system.

The application control engine is further configured, in response to determining whether the target process is allowed to execute, when the target process is not allowed to execute, to prevent an execution of the target process.

BRIEF DESCRIPTION OF THE DRAWINGS

The foregoing aspects and advantages of the present invention will become better understood upon reading the following detailed description and upon reference to the drawings where:

FIG. 2-A illustrates an exemplary hardware configuration of a client system according to some embodiments of the present invention.

FIG. 2-B illustrates an exemplary hardware configuration of a control server according to some embodiments of the present invention.

FIG. 3-A shows an exemplary guest virtual machine (VM) exposed by a hypervisor executing on a client system, and an application control engine executing outside the VM according to some embodiments of the present invention.

FIG. 3-B shows an alternative configuration, wherein a control VM enforces application control in a separate guest virtual machine according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A computer program is said to execute within or inside a virtual machine (or that the respective virtual machine executes the respective computer program) when the respective computer program executes on at least one virtual processor of the respective virtual machine. A process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

Figure 1:
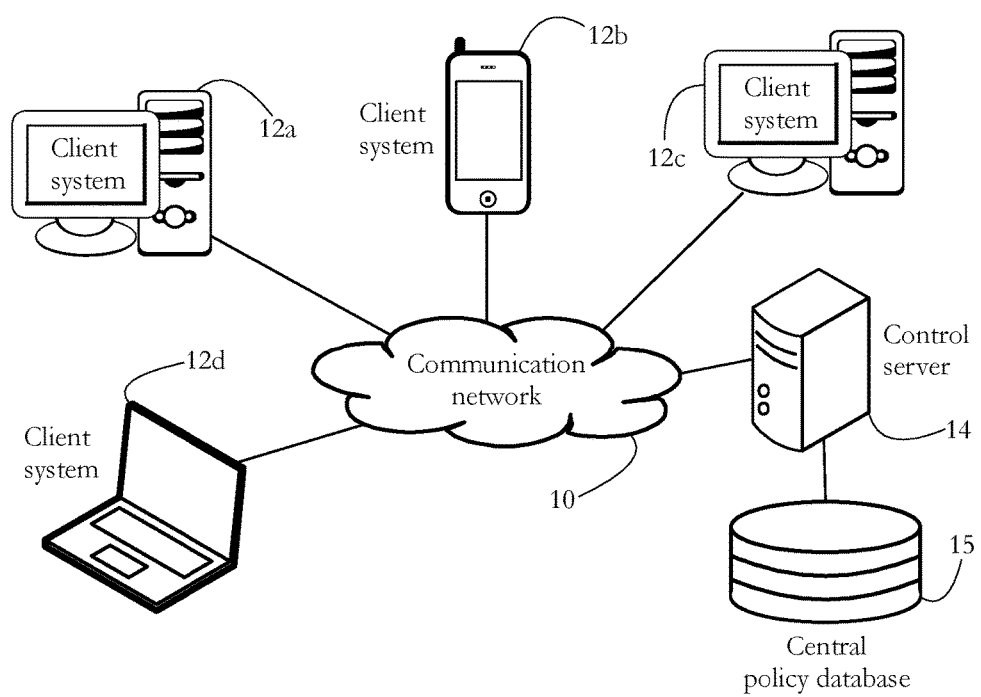
FIG. 1 illustrates an exemplary application control configuration wherein a plurality of client systems are connected to a control server according to some embodiments of the present invention.

The following description illustrates embodiments of the invention by way of example and not necessarily by way of limitation:

FIG. 1 shows an exemplary application control configuration according to some embodiments of the present invention, wherein a plurality of client systems 12a-d are communicatively coupled to a remote control server 14. Exemplary client systems 12a-d include corporate servers, personal computer systems, mobile computing platforms (laptop computers, tablets, mobile telephones), entertainment devices (TVs, game consoles), wearable devices (smartwatches, fitness bands), household appliances, and any other electronic device comprising a processor and a memory and capable of operating a hardware virtualization platform. Client systems 12a-d are interconnected via a communication network 10, such as a corporate network or the Internet. Parts of network 10 may include a local area network (LAN) and/or a telecommunication network (e.g., 3G network).

Control server 14 may collaborate with each client system 12a-d to carry out application control activities on the respective client system. Server 14 generically represents a set of interconnected computing systems, which may or may not be in physical proximity to each other. Exemplary application control activities include, among others, preventing a client system from executing any software apart from a subset of allowed applications. Another example of application control comprises allowing a client system to execute any software except for a set of prohibited applications. Examples of such application control include preventing all company computers from executing instant messaging (e.g., Yahoo!Messenger®) and Skype® software, or from executing a version of Adobe® Reader® software which is older than version 9. The allowed/disallowed applications may be user-specific, in the sense that some users of the respective client system may be allowed to run a set of application distinct from the allowed set of another user. The allowed/disallowed applications may also be client-specific, in the sense that the same user may be allowed to execute one set of applications on one client system, and a possibly distinct set of applications on another client system. Other exemplary application control activities include preventing software executing on a client system from using some hardware devices of the respective client system. For instance, some users may not be allowed to access the network from some client systems, some users may not be allowed to use a universal serial bus (USB) interface of the respective client system, etc. Yet another example of application control prevents software executing on a client system from using some services, protocols, uniform resource identifier (URI) schemes, etc. In one such example, some users may be allowed to send email, but not to access the web (use the hypertext transfer protocol—HTTP). Some users may be allowed to use the http: scheme, but not allowed to use the skype: and facebook: schemes, etc. A skilled artisan may appreciate that many other criteria may be incorporated in a similar fashion into application control. For instance, running some applications, protocols, etc., may be allowed only when the respective client system is connected to a certain part of a corporate network (e.g., to a specific wireless router), or only within certain time intervals (e.g., during lunch break, etc.).

In some embodiments, a central policy database 15 communicatively coupled to control server 14 comprises a set of policy records indicative of an application control policy to be applied to client systems 12a-d. An exemplary policy record comprises data encoding a control policy regarding an individual computer program (e.g., application). Other exemplary policy records may describe policies regarding a communication protocol, URI scheme, hardware device, network domain, etc.

An exemplary policy record regarding a computer program comprises a set of identification features allowing an identification of the respective program from among a plurality of computer programs (applications, components of the operating system, upgrade patches, etc.). Exemplary identification features include, among others, a name, an indicator of a maker of the respective computer program, an indicator of a version, an indicator of a file system path, an indicator of a release date, and a set of hashes of various code sections of the respective computer program. Another exemplary identification feature includes an aggregate identifier (e.g., a hash) computed according to a combination of a subset of other identification features enumerated above. Beside identification features, each policy record may store a flag indicating whether the respective computer program is allowed or disallowed. Policy database 15 may further store a set of mapping indicators indicating an association between each record and a particular client system and/or an association between the each record and a specific user/user category, etc. Such mapping of applications to users and/or client systems may allow control server 14 to determine, for instance, whether a specific user currently logged into a specific client system is allowed to execute a specific application.

An alternative way of managing application control policies includes whitelists and/or blacklists of computer programs. A whitelist may comprise indicators for a plurality of allowed computer programs, while a blacklist may include indicators of a plurality of disallowed computer programs. Database 15 may further associate each such list with a client system, a user/group of users, and/or other application control criteria such as network domains, time slices, etc.

FIG. 2-A shows an exemplary hardware configuration of a client system 12, such as systems 12a-d in FIG. 1. For simplicity, the illustrated client system is a computer system; the hardware configuration of other client systems such as mobile telephones, tablet computers, etc., may differ somewhat from the illustrated configuration. Client system 12 comprises a set of physical devices, including a hardware processor 16 and a memory unit 18. Processor 16 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 16 in the form of a sequence of processor instructions (e.g. machine code or other type of encoding). Memory unit 18 may comprise volatile computer-readable media (e.g. DRAM, SRAM) storing instructions and/or data accessed or generated by processor 16.

Input devices 20 may include computer keyboards, mice, and microphones, among others, including the respective hardware interfaces and/or adapters allowing a user to introduce data and/or instructions into client system 12. Output devices 22 may include display devices (e.g., monitor, liquid crystal display) and speakers, as well as hardware interfaces/adapters such as graphic cards, allowing client system 12 to communicate data to a user. In some embodiments, input devices 20 and output devices 22 may share a common piece of hardware, for instance a touch-screen device. Storage devices 24 include computer-readable media enabling the non-volatile storage, reading, and writing of software instructions and/or data. Exemplary storage devices 24 include magnetic and optical disks and flash memory devices, as well as removable media such as CD and/or DVD disks and drives. The set of network adapters 26 enables client system 12 to connect to a computer network and/or to other electronic devices. Controller hub 28 represents the plurality of system, peripheral, and/or chipset buses, and/or all other circuitry enabling the communication between processor 16 and devices 18, 20, 22, 24, and 26. For instance, controller hub 28 may include a memory controller, an input/output (I/O) controller, and an interrupt controller, among others. In another example, controller hub 28 may comprise a northbridge connecting processor 16 to memory 18 and/or a southbridge connecting processor 16 to devices 20, 22, 24, and 26.

FIG. 2-B shows an exemplary hardware configuration of control server 14 according to some embodiments of the present invention. Server 14 comprises at least one hardware processor 116 (e.g., microprocessor, multi-core integrated circuit), a physical memory 118, server storage devices 124, and a set of server network adapters 126. Adapters 126 may include network cards and other communication interfaces enabling control server 14 to connect to communication network 10. In some embodiments, server 14 further comprises input and output devices, which may be similar in function to input/output devices 20 and 22, respectively.

In some embodiments, client system 12 is configured to expose a set of virtual machines, for instance as illustrated in FIGS. 3-A-B. A virtual machine (VM) emulates an actual physical machine/computer system, using any of a variety of techniques known in the art of hardware virtualization. In some embodiments, a hypervisor 30, also known in the art as a virtual machine monitor (VMM), executes on client system 12 and is configured to create or enable a plurality of virtualized devices, such as a virtual processor and a virtual memory management unit, and to expose such virtualized devices to software, in place of the real, physical devices of client system 12. Such operations are commonly known in the art as exposing a virtual machine. Hypervisor 30 may further enable multiple virtual machines to share the hardware resources of client system 12, so that each VM operates independently and is unaware of other VMs executing concurrently executing on client system 12. Examples of popular hypervisors include the VMware vSphere™ from VMware Inc. and the open-source Xen hypervisor, among others.

In some embodiments, exposing guest VM 32 comprises configuring a data structure used by hypervisor 30 to manage operation of guest VM 32. Such a structure will be herein termed virtual machine state object (VMSO). Exemplary VMSOs include the virtual machine control structure (VMCS) on Intel® platforms, and the virtual machine control block (VMCB) on AMD® platforms. In some embodiments, processor 16 associates a region in memory with each VMSO, so that software may reference a specific VMSO using a memory address or pointer (e.g., a VMCS pointer on Intel® platforms).

Each VMSO may comprise data representing a current state of a respective virtualized processor exposed on client system 12. In multithreading configurations, hardware processor 16 may operate a plurality of cores, each core further comprising multiple logical processors, wherein each logical processor may process an execution thread independently of, and concurrently with, other logical processors. Multiple logical processors may share some hardware resources, for instance, a common MMU. In a multithreaded embodiment, a distinct VMSO may be set up for each distinct logical processor. The respective VMSO may comprise a guest state area and a host state area, the guest state area holding the CPU state of the respective VM, and the host state area storing the current state of hypervisor 30. In some embodiments, the guest-state area of the VMSO includes contents of the control registers (e.g., CR0, CR3, etc.), instruction pointer (e.g., RIP), general-purpose registers (e.g., EAX, ECX, etc.), and status registers (e.g., EFLAGS) of the virtual processor of the respective VM, among others. The host state area of the VMSO may include a pointer (e.g., an EPT pointer on Intel® platforms) to a page table configured for address translations for the respective VM.

In some embodiments, processor 16 may store a part of a VMSO within dedicated internal registers/caches, while other parts of the respective VMSO may reside in memory 18. At any given time, at most one VMSO (herein termed the current VMSO) may be loaded onto a logical processor, identifying the virtual machine currently having control of the respective logical processor. When processor 16 switches from executing a first VM to executing a second VM or hypervisor 30, processor 16 may save the current state of the first VM to the guest state area of the current VMSO.

In the exemplary configurations illustrated in FIGS. 3-A-B, guest VM 32 executes a guest operating system (OS) 34, and a set of applications 36a-b. Guest OS 34 may comprise any widely available operating system such as Microsoft Windows®, MacOS®, Linux®, iOS®, or Android™, among others, providing an interface between applications executing within VM 32 and the virtualized hardware devices of VM 32. Applications 36a-b generically represent any software application, such as word processors, spreadsheet applications, graphics applications, database management applications, browsers, social media, and electronic communication applications, among others.

In the embodiment illustrated in FIG. 3-A, an application control engine 40a executes outside of guest VM 32, at the processor privilege level of hypervisor 30 (e.g., root level or ring −1). Application control engine 40a is configured to enforce application control in guest VM 32, for instance to prevent the execution of certain software, by certain users of guest VM 32, etc. In some embodiments, a control agent 42 executes within guest VM 32, for instance at the processor privilege level of guest OS 34 (e.g., ring 0, kernel mode). Agent 42 may harvest data relevant for application control, and communicate such data to engine 40a. Placing a control agent within guest VM 32 is advantageous, since some information is much easier to obtain from within than from outside a virtual machine. A disadvantage of such configurations is that any software executing within a virtual machine is potentially vulnerable to malware executing within the respective VM. To mitigate this security risk, instead of having control agent 42 permanently installed within guest VM 32, some embodiments temporarily drop the agent into the respective VM as described in detail below.

In an alternative embodiment illustrated in FIG. 3-B, hypervisor 30 is configured to expose a control VM 33 separate from all guest VMs executing on client system 12, wherein control VM 33 may execute concurrently with guest VM(s) 32. Some embodiments of control VM 33 comprise a lightweight, minimal operating system (e.g., a customized version of a Linux® OS), and are configured to execute a application control engine 40b configured to enforce application control in guest VM 32. The virtual environments of guest VM 32 and control VM 33 may be isolated from each other using any method known in the art of virtualization, to ensure that malicious software executing within guest VM 32 cannot infect or otherwise interfere with software executing within control VM 33. In the embodiment of FIG. 3-B, an introspection engine 44 executes outside guest VM 32 and control VM 33, at the processor privilege level of hypervisor 30. In the exemplary embodiment of FIG. 3-A, some of the activities of introspection engine 44 may be performed at least in part by application control engine 40a.

Although FIGS. 3-A-B were drafted to show only one guest VM 32 executing on client system 12, some embodiments may be configured to enforce application control in a client system running multiple guest VMs. Typical examples of such virtualization platforms are webserver farms, wherein a single computer system may host hundreds of distinct webserver VMs operating concurrently. Another typical example is an embodiment of a concept commonly known in the art as virtual desktop infrastructure (VDI), wherein a user's applications execute on a first computer system, while the user interacts with the respective applications via a second computer system (terminal). In typical VDI configurations, a virtual machine running the requested application is instantiated on-demand on the first computer system, which may end up executing hundreds of such VMs for multiple remote users. In such embodiments, a single application control engine 40a-b may enforce application control in multiple guest VMs, or in all guest VMs executing on the respective client system. For instance, application control engine 40a-b may drop a control agent inside each of the respective guest VMs. In one such example, application control engine 40a-b may select a type of control agent and adjust the agent dropping procedure according to hardware and/or software specifications of each guest VM, for instance according to a type of OS executing within the respective guest VM. In some embodiments, application control engine 40a-b may be instructed by server 14 to selectively enforce application control in a particular target VM, or in a selected subset of guest VMs executing on the respective client system.

In some embodiments, introspection engine 44 (FIG. 3-B) is configured to detect various events occurring during execution of software within guest VM 32, and to exchange such information with application control software (e.g., agent 42 and/or engines 40a-b). Exemplary events detected by introspection engine 44 include, for instance, a processor exception and/or interrupt, an attempt to execute a particular function of guest OS 34, a change of processor privilege (e.g., a system call), an attempt to access (read from, write to, and/or execute from) a particular memory location, etc. Introspection engine 44 may be further configured to determine memory addresses of various software components executing within guest VM 32, as further described below.

Virtual machines typically operate with a virtualized physical memory, also known in the art as guest-physical memory. Virtualized physical memory comprises an abstract representation of the actual physical memory 18, for instance as a contiguous space of addresses specific to each VM, with parts of said space mapped to addresses within physical memory 18 and/or physical storage devices 24. In modern hardware virtualization platforms, such mapping is typically achieved via dedicated data structures and mechanisms controlled by processor 16, known as second level address translation (SLAT). Popular SLAT implementations include extended page tables (EPT) on Intel® platforms, and rapid virtualization indexing (RVI)/nested page tables (NPT) on AMD® platforms. In such systems, virtualized physical memory is partitioned in units known in the art as pages, a page representing the smallest unit of virtualized physical memory individually mapped to physical memory via SLAT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the SLAT structures and therefore the mapping between physical memory and virtualized physical memory. In some embodiments, a pointer to a SLAT data structure (e.g., to a page table) is stored within the VMSO of the respective virtual machine. The actual mapping (translation) of a virtualized physical memory address to a physical memory address may comprise looking up the physical memory address in a translation lookaside buffer (TLB) of client system 12. In some embodiments, address translation comprises performing a page walk, which includes a set of successive address look-ups in a set of page tables and/or page directories, and performing calculations such as adding an offset of a page to an address relative to the respective page.

Figure 4:
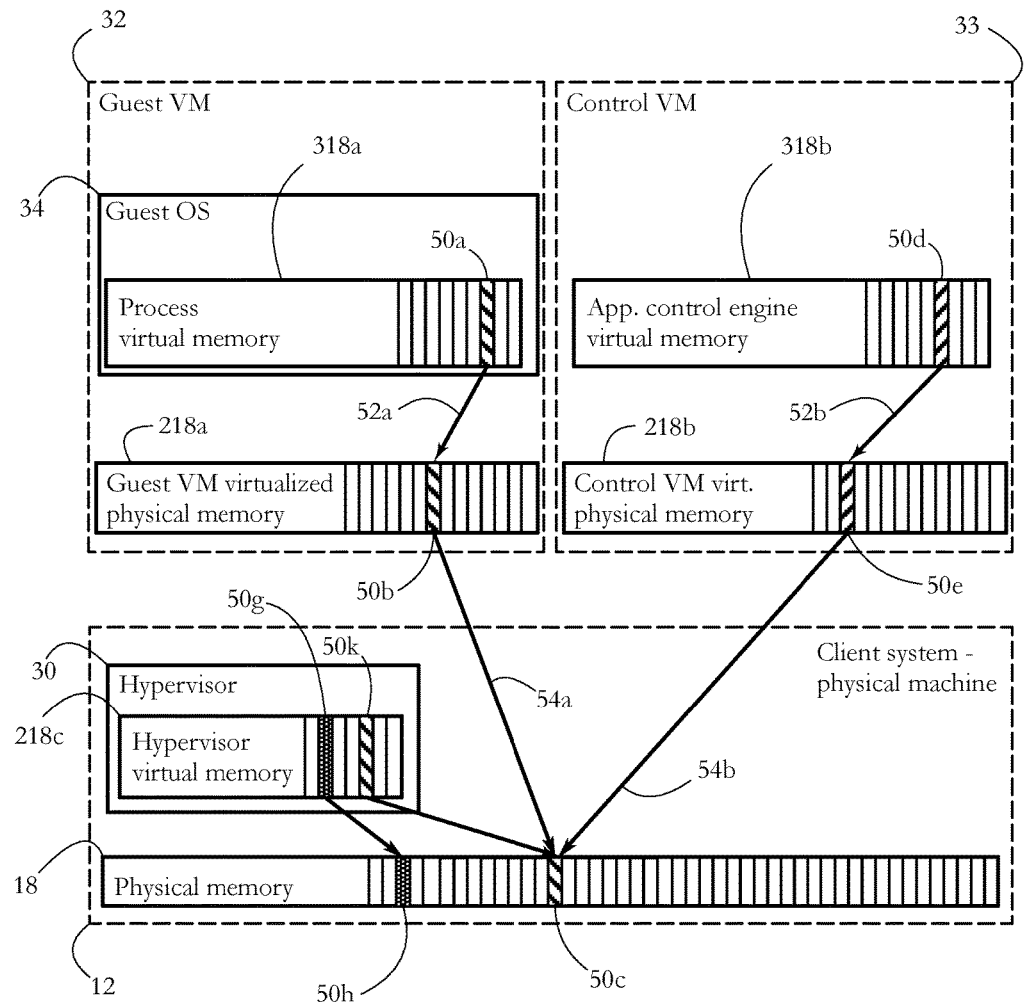
FIG. 4 shows an exemplary memory mapping in an embodiment of the present invention as shown in FIG. 3-B.

FIG. 4 illustrates such a mapping of memory addresses in an embodiment as shown in FIGS. 3-A-B. Following exposure by hypervisor 30, guest VM 32 sees a virtualized physical memory space 218a as its own physical memory space. A software object (e.g., a process) executing within guest VM 32 is assigned a virtual memory space 318a by guest OS 34. When the software object attempts to access a content of an exemplary memory page 50a of space 318a, an address of page 50a is translated by the virtualized processor of guest VM 32 into an address of a page 50b of virtualized physical memory space 218a, according to page tables configured and controlled by guest OS 34a. The address of page 50b is further mapped by physical processor 16 to an address of a page 50c within physical memory 18 using SLAT configured by hypervisor 30.

In an embodiment having control VM 33 executing beside guest VM 32, control VM 33 is assigned a virtualized physical memory 218b by hypervisor 30. A software object executing within control VM 33, e.g. application control engine 40b, uses a virtual memory space 318b. A page 50d within space 318b is mapped by the virtualized processor of control VM 33 to a page 50e of guest-physical space 218b, for instance via page tables set up by an operating system of control VM 33. The address of page 50e is further translated by physical processor 16 to an address within physical memory, via SLAT configured by hypervisor 30.

Virtual address spaces 218a-b are commonly known in the art as guest-physical memory, and an address within one such memory space is referred to as a guest physical address (GPA). Address spaces 318a-b are usually termed guest-virtual memory, and contain guest-virtual addresses (GVA). Addresses within physical memory 18 are usually referred to as host-physical addresses (HPA). An address translation/mapping such as 52a-b in FIG. 4 is therefore termed GVA-to-GPA translation. In contrast, address translations such as 54a-b are commonly known as GPA-to-HPA translations.

In some embodiments, hypervisor 30 sets up its own virtual memory space 218c comprising a representation of physical memory 18, and employs a translation mechanism (for instance, page tables) to map addresses in space 218c to addresses in physical memory 18. In FIG. 4, such an exemplary mapping translates the address of a page 50k within virtual space 218c to the physical address of page 50c, and the address of a page 50g to the physical address of page 50h. Such mappings allow potentially any software object executing at the processor privilege level of hypervisor 30 to manage memory pages belonging to software objects executing within various VMs running on client system 12. In particular, application control engine 40a and/or memory introspection engine 44 may read, write, and control access to various sections of the memory space of a process executing within guest VM 32. Hypervisor 30 may even map virtual memory pages belonging to distinct VMs to one and the same page in physical memory, as illustrated in the example of FIG. 4. Thus, application control engine 40b executing within control VM 33 may gain access to the memory space of a process executing within guest VM 32.

In some embodiments, software executing outside guest VM 32 may detect an event occurring within guest VM 32. Several methods for such detection are known in the art. In one example, application control engine 40a (FIG. 3-A) or introspection engine 44 (FIG. 3-B) may collaborate with hypervisor 30 to set memory access permissions within a SLAT data structure. Such features may be platform-specific, but access permissions are typically set with page granularity. For instance, on Intel® platforms that support virtualization, the EPT entry of each physical memory page includes a set of access permission bits that indicate whether the respective page may be read from, written to, and executed, respectively. When an attempt to access a particular memory page violates an access permission set for the respective memory page, the respective attempt may trigger a processor event, such as an exception or a virtual machine exit event (VMExit on Intel® platforms). In response to the processor event, processor 16 may switch to executing an event handler routine, which allows application control engine 40a and/or introspection engine 44 to detect the occurrence of the respective access violation. Such mechanisms may detect, for instance, an attempt to call a particular function, by marking the memory page containing a part of the respective function as non-executable.

For simplicity and without loss of generality, the following description will focus on an exemplary embodiment configured as illustrated in FIG. 3-A. A skilled artisan will understand that the described systems and methods may be adapted to other configurations, and in particular to the exemplary configuration of FIG. 3-B. In the following description, the application control engine(s) will be generically labeled 40, which may represent either engine 40a or engine 40b, depending on the chosen configuration.

Figure 5:
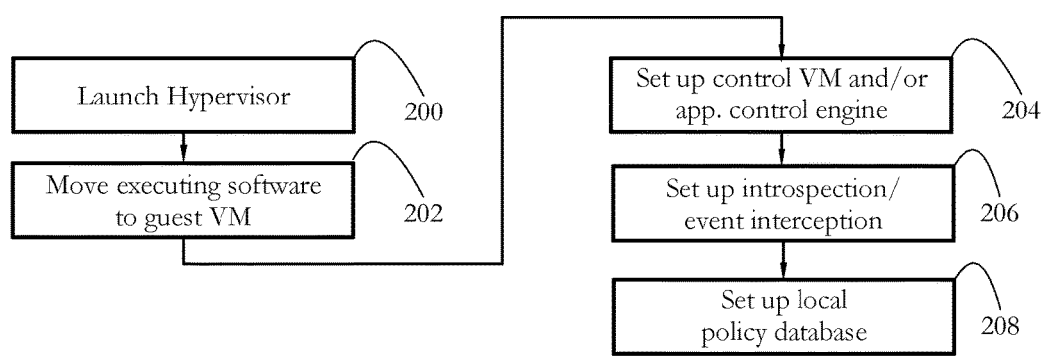
FIG. 5 shows an exemplary sequence of steps carried out by an installer application to set up application control on a client system according to some embodiments of the present invention.

FIG. 5 shows an exemplary sequence of steps performed to set up application control on a client system according to some embodiments of the present invention. In a typical scenario of application control in a corporate network, a network administrator may install application control software on each client system 12a-d. The application control software may comprise various components, such as application control engine 40, introspection engine 44, etc. The illustrated sequence of steps may be carried out, for instance, by an installer utility of the respective application software. When installed on a client system not currently operating in a hardware virtualization configuration, the app control software may first take over processor 16 at the most privileged level (e.g., VMXRoot on Intel® platforms supporting virtualization, otherwise commonly known and root mode or ring −1), and install hypervisor 30. Hypervisor 30 may then expose guest VM 32 and displace all software previously executing on the respective client system to guest VM 32. Hypervisor 30 may further set up application control engine 40 and/or introspection engine 44. When installed on a hardware virtualization platform already running a set of virtual machines, steps 200-202 may be omitted.

In a further step 206, the installer may configure introspection and/or event interception from the level of hypervisor 30. Step 206 may comprise, for instance, setting access permissions to some memory pages used by guest VM 32 so that an attempt to access the respective page will trigger a processor event (e.g., a VM Exit event) enabling app control engine 40 and/or introspection engine 44 to detect the occurrence of an event (e.g., a system call) within guest VM 32. In some embodiments, step 206 may further set up a signaling and/or communication mechanism between components executing within the guest VMs (e.g., control agents 42) and components executing outside the respective VMs (e.g. application control engine 40, introspection engine 44). Such communication or signaling may use any method known in the art of hardware virtualization. In one example, two software components may transmit data between each other via a section of physical memory shared by the two software components. To send data from a first component executing inside a VM to a second component executing outside the respective VM, some embodiments may register the second component as a VM exit event handler with processor 16. The first software component may write the data to the shared memory section and then issue a privileged processor instruction (e.g., VMCALL on Intel® platforms), thus causing a VM exit event. The second component executing outside the respective VM may thus be notified that the first component is trying to transmit data. Conversely, to send data from the second component to the first component, the second component may write the data to the shared memory section and then inject an interrupt into the respective VM. The interrupt will be handled by an interrupt handler executing within the respective VM (for instance, by the first software component). Thus, the first component may detect that the second component is trying to transmit data. In some embodiments, step 206 comprises registering the appropriate software components as handlers for various processor events, to enable the communication mechanism described above.

In some embodiments, a further step 208 may set up a local policy database on storage devices 24 and/or on computer-readable media communicatively coupled to client system 12. An exemplary local policy database may comprise application control policies applicable to the respective client system. The local policy database may effectively act as a cache, to minimize network traffic between client system 12 and control server 14, and to accelerate application control operations. To set up the local policy database, the installer may retrieve a subset of policy records from server 14. More details of using policy database(s) are given below.

Figure 6:
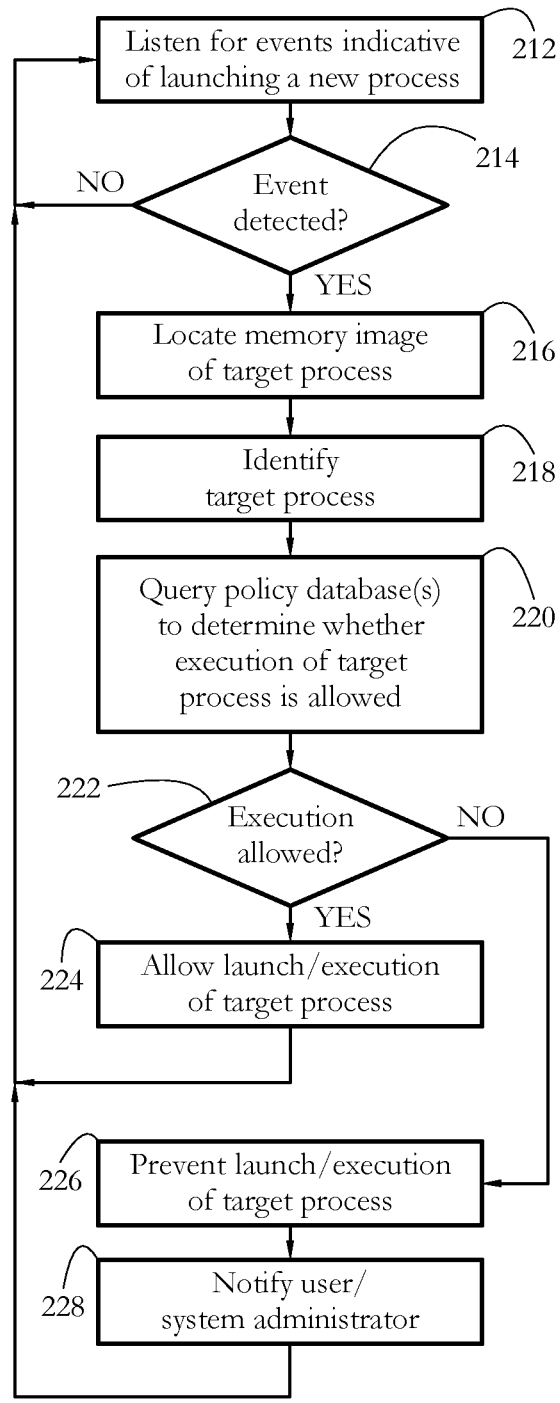
FIG. 6 shows an exemplary sequence of steps performed by an application control engine according to some embodiments of the present invention.

FIG. 6 shows an exemplary sequence of steps performed by application control engine 40 according to some embodiments of the present invention. In a sequence of steps 212-214, engine 40 may listen for events indicating the launch of a new process within guest VM 32. Process launches typically comprise a sequence of operations performed by guest OS 34 (such as setting up a guest-virtual memory space, loading executable code of the process into memory, creating a processor thread for the respective process, etc.). Some embodiments detect the launch by detecting a selected operation within the sequence, the operation performed in preparation for the actual execution of the process. Alternative embodiments may detect the launch by detecting a consequence of the respective launch.

To detect the launch of the protected process, some embodiments of app control engine 40 monitor data structures and/or mechanisms used by guest OS 34 to manage process lifecycle events. For example, some versions of the Windows® OS maintain a list of active processes. Each time a process is created, an indicator of the respective process is inserted into the list of active processes; the indicator is removed from the list upon termination of the respective process. The kernel of OS 34 typically represents each process as a data structure (e.g., executive process block—EPROCESS in Windows®), which comprises, among others, handles to each of the threads of the respective process, and a unique process ID allowing OS 34 to identify the respective process from a plurality of executing processes. To detect the creation of a new process data structure some embodiments detect a call to an internal function of OS 34, wherein the respective function is configured to add a new item to the list of active processes. An example of such function of the Windows® OS is PspinsertProcess. Detecting such a call can be achieved using any hooking method known in the art. In a hardware virtualization environment, a preferred method comprises changing an access permission for the memory page storing a part of the targeted function, to mark the respective page as non-executable. A subsequent attempt by software executing within the respective VM to call the respective function will trigger a processor event (e.g., VMExit), thus notifying app control engine 40 or introspection engine 44. Another possible method of detecting a call to the respective OS function comprises applying a re-direction patch to the respective function, such as a VMCALL instruction or a JMP instruction. Other embodiments may modify the EPT entry of the respective OS function, to point to a new address. The effect of such patches and/or EPT hooks is to redirect execution of the native OS function to a fragment of code provided by app control engine 40 or introspection engine 44. Yet another embodiment may use a memory hook (such as an EPT hook) to gain access to an address of a section of memory storing the list of active processes, and detect an attempt to modify the respective list. Similar techniques may be used to detect the execution of other kernel functions that carry out other steps of the process launch. The identity and operational details of such kernel functions are OS-specific.

In a preferred embodiment, the sequence of steps 212-214 detects the creation of a virtual memory space for the respective process (e.g., virtual memory 318$a$ in FIG. 4). This particular step performed by the OS in preparation for launching a new process may be detected in several ways. Virtual memory spaces are typically indexed with a pointer to a page table used by the OS to perform GVA-to-GPA translations (e.g., translation 52$a$ in FIG. 4) for software using the respective virtual memory space. The respective pointer is typically stored in a control register of processor 16, for instance in the CR3 register of the x86 family of processors, which is why the respective pointer is commonly referred to as the CR3 pointer. In one exemplary embodiment, application control engine 40 and/or introspection engine 44 maintain a list of CR3 pointer values for each guest VM exposed on client system 12. The list of CR3 values is equivalent to a list of virtual memory spaces, or to a list of processes currently executing within each VM. The list of processes currently in execution maintained internally by guest OS 34 may be vulnerable to malicious software executing within guest VM 32. For instance, carefully crafted malware may itself monitor the creation of new processes, so as to hide malicious software from security software installed on guest VM 32. In addition, malware may prevent application control engine 40 from accessing the respective list. Maintaining a parallel list of processes currently in execution, i.e., an independent list that does not rely on the internal process list of guest OS 34, may therefore increase the reliability and security of application control.

Figure 7:
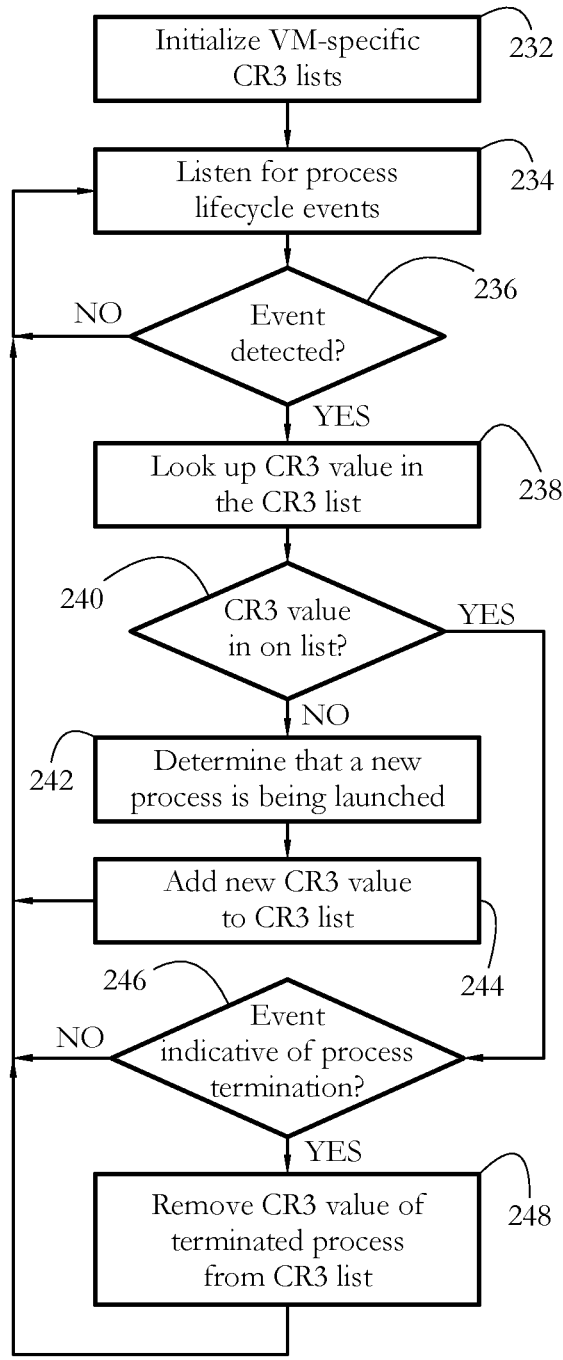
FIG. 7 illustrates an exemplary sequence of steps performed by the application control engine and/or introspection engine to maintain a list of processes currently in execution within a guest VM, according to some embodiments of the present invention.

FIG. 7 shows an exemplary sequence of steps performed by app control engine 40 and/or introspection engine 44 to maintain the list of CR3 values according to some embodiments of the present invention. A step 232 creates a distinct list of CR3 values for each guest VM exposed on client system 12. Step 232 may, for instance, associate each list with a distinct VMSO. The initial list may be created, for instance, by monitoring the boot of guest VM 34. Then, a sequence of steps 234-236 may listen for process lifecycle events, such as process creation, termination, forking, etc. Each time such an event is detected, app control engine 40 and/or introspection engine 44 may read the value of the CR3 pointer from the appropriate register of processor 16 and compare the respective value with the current list of values. When the value is not found on the list, app control engine 40 and/or introspection engine 44 may determine that a new virtual memory space was created, and may add the new CR3 value to the list (steps 242-244). In response to detecting the termination of a process, a step 248 may remove the respective CR3 value is from the list.

One exemplary manner of detecting the creation of a new virtual memory space comprises detecting an attempt to write to a control register of processor 16 (e.g., the CR3 register). In an embodiment wherein client system 12 has a processor belonging to the x86 family, writing to the CR3 register may comprise executing a processor instruction of the type:

MOV CR3, <value>.

In some embodiments, app control engine 40 and/or introspection engine 44 may collaborate with hypervisor 30 to configure processor 16 to trigger an exception or a VM exit event in response to an attempted write to the CR3 register. Such configurations are allowed on some processor families, for instance on processors from Intel® having VT-x® extensions. By registering app control engine 40 or introspection engine 44 as a handler for the respective exception/VM exit, app control engine 40 or introspection engine 44 may detect the attempt to write to the CR3 register, and may determine the required pointer value by reading the content of the CR3 register, or by analyzing an operand of the intercepted instruction. The respective value may then be compared to the current list of CR3 values to determine whether it corresponds to a new process or not.

In response to detecting an attempt to launch and/or execute a new process, in a step 216 (FIG. 6), application control engine 40 and/or introspection engine 44 may locate a memory image of the respective new process, hereby termed target process. The memory image may comprise executable code and/or non-executable data of the respective process. Locating the image comprises identifying at least one memory page of memory 18, the page storing code/data of the target process. In typical computer architectures, the CR3 pointer indicates the GPA of a page directory (PD), such as a page-map level 4 (PML4) table, for instance. Entries into the PD or PML4 table further point to other address translation data structures, such as other page directories or page tables (PT). Some embodiments may iteratively walk such address translation data structures, until the level of individual memory pages. In one exemplary embodiment, control engine 40 and/or introspection engine 44 may identify the memory page storing the PD/PML4 table according to the CR3 value, and collaborate with hypervisor 30 to reset access permissions, making the respective page non-writable. A subsequent attempt by the OS to write to the respective page may indicate that the OS is currently allocating and/or mapping memory for the target process, constructing the required hierarchy of page directories and page tables. By intercepting the attempt to write to the PML4 table, some embodiments may further obtain knowledge about the page table hierarchy. For instance, when the PD entries are filled in, app control engine 40 and/or introspection engine 44 may determine a GPA of a page directory. The memory page storing the respective PD may then be write-protected. From a detected attempt to write to the respective PD, app control engine 40 and/or introspection engine 44 may determine a GPA of a page table, etc. By write-protecting a memory page storing a page table for the target process, and by detecting an attempt by the OS to write to the respective PT, app control engine 40 and/or introspection engine 44 may determine a memory page storing code/data for the respective process. Finally, by protecting a part of the memory image of the target process from execution, and by intercepting an attempt to execute code from the respective memory page, app control engine 40 and/or introspection engine 44 may locate a section of code of the target process.

The above scenario comprises performing step 216 from outside guest VM 32. An alternative embodiment may locate the memory image of the target process by installing an agent (e.g., a driver) within VM 32, and using the agent to obtain the required information by querying OS 34. One advantage of the first approach is increased security, since an agent operating within VM 32 is more vulnerable to malicious software. One disadvantage is that the first approach is more computationally intensive than the second approach (the repeated VM exits required to determine the respective addresses/memory pages may amount to a substantial overhead).

In a further step 218, application control engine 40 may identify the target process according to the memory image located in step 216. Identifying the target process may include, for instance, determining an application type (e.g., word processor, file manager, etc.), a manufacturer (e.g., Microsoft®, Adobe®, etc.), and a software version of the target process. Some embodiments may identify the target process according to a content of a memory page storing code/data of the target process. For instance, application control engine 40 may calculate a set of hashes, each hash calculated for a distinct section of memory used by the target process. The set of hashes may then be matched against reference hashes stored in local and/or central policy database 15, 115. An exemplary alternative method for identifying the target process comprises extracting identification information from process management structures of guest OS 34. In a Windows® environment, such information may be stored in an EPROCESS or KPROCESS structure associated with the target process.

Activities associated with step 218 may be performed either from outside, or from inside guest VM 32. In one exemplary embodiment, application control 40 may directly analyze the memory image of the target process to compute hashes, etc. Application control 40 may also obtain a memory address of the process management data structures (e.g., EPROCESS), and analyze various fields of the respective data structures.

In an alternative embodiment, step 218 may comprise temporarily dropping a software agent (e.g., app control agent 42 in FIGS. 3-A-B) into guest VM 32. Control agent 42 may then obtain process-identifying information from inside the respective VM. By executing inside the controlled VM, for instance at the processor privilege level of the kernel (e.g., ring 0, kernel mode), control agent 42 may have access to a wealth of information and may be able to call various OS management functions. Such information may be substantially more difficult to obtain directly from the level of hypervisor 30. A detailed account of dropping control agent 42 into guest VM 32 is given further below, in relation to FIGS. 9-11.

Once the target process is identified, a step 220 may query local and/or central policy database 15, 115 to determine whether the target process is allowed to execute on client system 12. In an embodiment wherein control policies comprise various additional conditions (e.g., a policy specifies which users are allowed to execute which applications, during which time intervals, etc.), step 220 may further comprise determining whether a set of allowance conditions are satisfied, for instance time conditions, user conditions, network connectivity conditions, hardware compliance conditions, etc.

Figure 8:
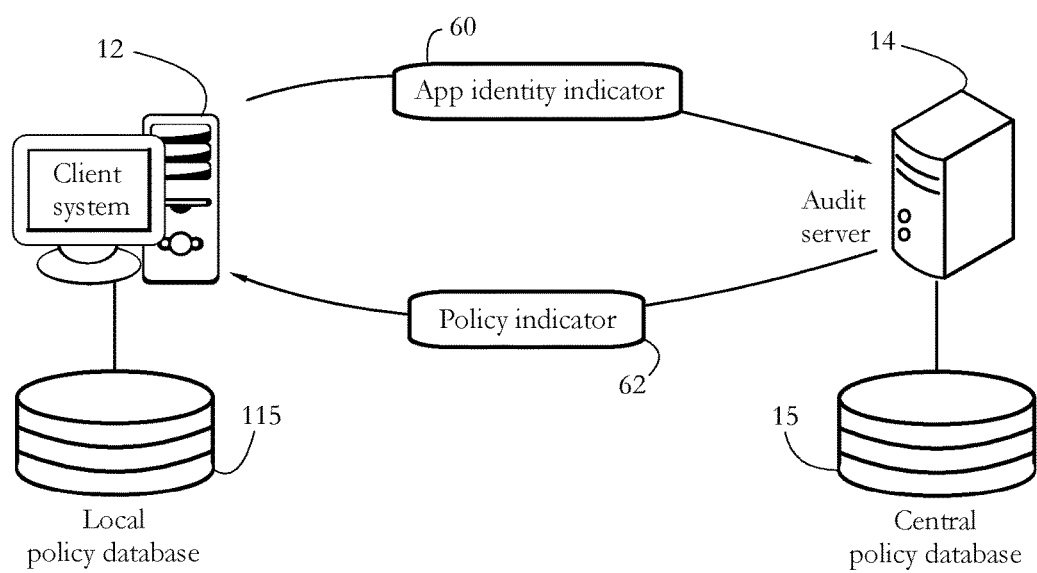
FIG. 8 shows an exemplary data exchange between a client system and the control server according to some embodiments of the present invention.

In one exemplary embodiment illustrated in FIG. 8, application control engine 40 may search for a policy referring to the target process within policy database 115. When such a policy is found, app control engine may determine according to the respective app control policy whether to allow execution of the target process or not. When no such policy exists in database 115, app control engine 40 may send an application identity indicator 60 indicative of an identity of the target process to application server 14. In response, server 14 may query central policy database 15 with respect to policies regarding the target process, and may return a policy indicator 62 indicating whether execution of the target process is allowed. Some embodiments of application control may store policy indicator 62 in local policy database 115 for future use.

When a determination is made that the execution of the target process can proceed, in a step 224, application control engine 40 may allow execution of the target process. Allowing the execution may comprise, for instance, resetting memory access permissions configured for various memory pages associated with the target process. When application control policies do not allow the target process to execute, a step 226 may prevent the launch and/or execution of the respective process. In one exemplary embodiment, step 226 may comprise app control engine 40 collaborating with hypervisor 30 to mark all pages containing code of the respective process as non-executable. In another example, app control engine 40 and/or hypervisor 30 may intercept an attempt to execute code belonging to the target process, and in response, modify an instruction pointer of processor 16 (e.g., RIP on x86 platforms) to change the original flow of execution of the target process—for instance, to redirect execution to a handler configured to display a notification to the user. The RIP may be changed, for instance, by editing a particular field of the guest state area of the VMSO of the respective VM. In some embodiments, in a step 228, application control engine 40 may display a notification indicating that the target process was not allowed to execute. In addition, some embodiments may send a notification to a system administrator and/or to an automatic event harvesting engine of control server 14.

Figure 9:
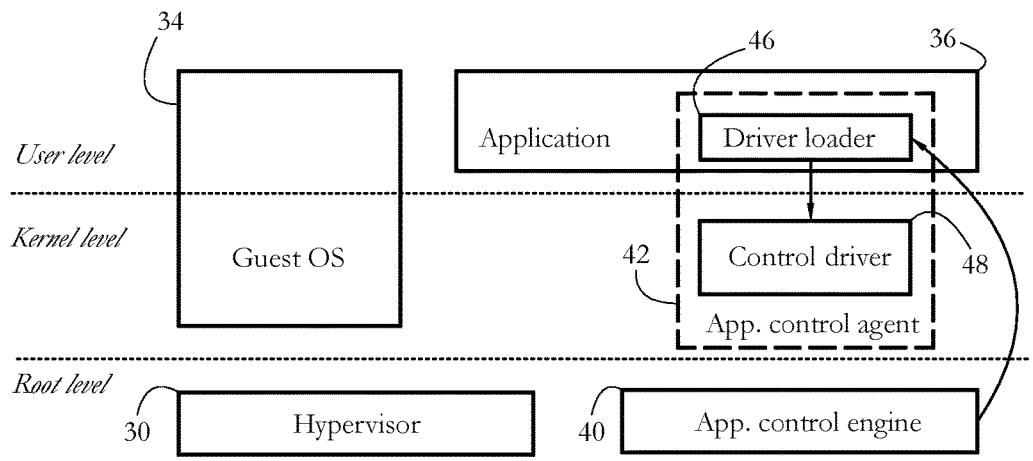
FIG. 9 shows exemplary components of a application control agent executing at various processor privilege levels according to some embodiments of the present invention.
Figure 10:
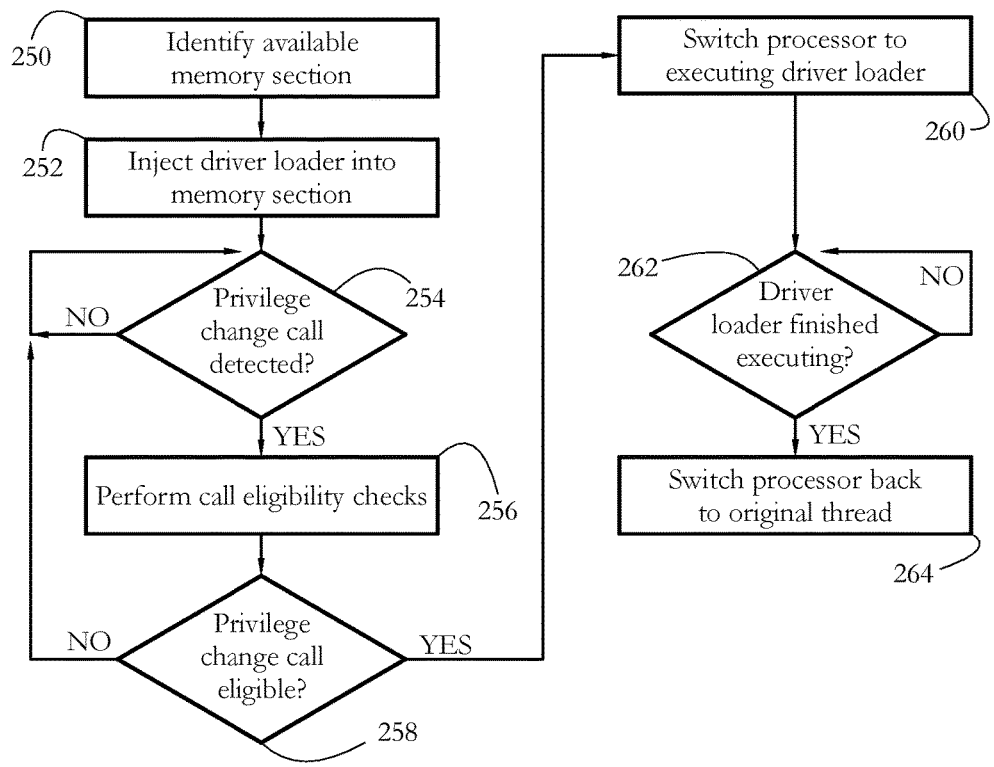
FIG. 10 shows an exemplary sequence of steps performed by the application control engine to drop the application control agent into a guest VM according to some embodiments of the present invention.
Figure 11:
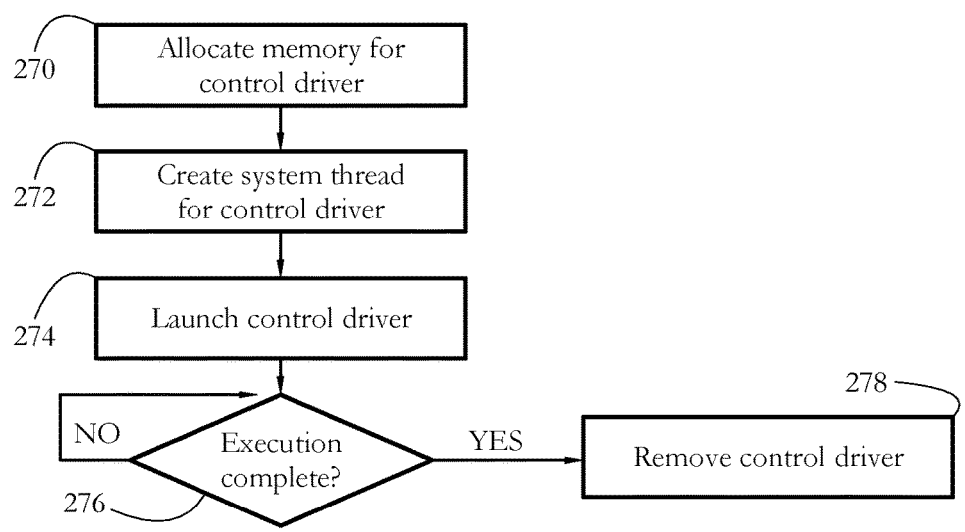
FIG. 11 illustrates an exemplary sequence of steps performed by the driver loader of the application control agent according to some embodiments of the present invention.

FIGS. 9-10-11 illustrate an exemplary embodiment which temporarily drops an application control agent within guest VM 32 to perform various investigations, for instance to obtain data allowing an identification of the target process. The agent may then communicate the data to a component executing outside guest VM 32, e.g., to application control engine 40. Application control agent 42 (FIGS. 3-A-B) may be crafted according to a type of the controlled VM, e.g., according to a type of guest OS 34 currently executing within the guest VM 32. OS type may comprise a name indicator, such as Windows®, and a version indicator, such as 7, Home, or Enterprise, among others. In some embodiments, app control engine 40 identifies the type of OS according to a content of a model-specific register (MSR) of guest VM 32, or to a content of a section of memory pointed to by the respective MSR. In some embodiments, control engine 40 may determine the name of OS according to data being written to such MSRs by software executing within guest VM 32. For instance, engine 40 may intercept instructions to write to a SYSENTER or to a SYSCALL MSR, and determine the type of OS currently executing, or currently initializing, according to a parameter of such a write instruction. Other exemplary registers, which may provide information about the OS name include control registers, interrupt descriptor table (IDT), and global descriptor table (GDT), among others. For identifying OS type according to MSR writes, control engine 40 may further use pattern matching against a pre-determined library of fast system-call handlers specific to each OS (e.g., system calls handled according to a content of the SYSCALL or SYSENTER MSRs). Such fast system-call libraries may be provided with control engine 40 and/or introspection engine 44, and may be kept up to date via periodic or on-demand software updates.

In some embodiments, a version indicator (such as a release name, build number, etc.) may be obtained by parsing certain kernel data structures specific to the respective type of OS. Exemplary data structures allowing identification of the OS version are certain export symbols of the Linux® kernel or certain exported symbols of the Windows® kernel, such as the NtBuildNumber, among others.

FIG. 9 shows exemplary components of app control agent 42 from a perspective of processor privilege levels (rings, modes). In some embodiments, agent 42 comprises a driver loader 46 and a control driver 48. Driver loader 46 may be injected by application control engine 40 into a running application 36, such as applications 36a-b in FIGS. 3-A-B. Driver loader 46 may therefore execute at the privilege level of application 36, typically in ring 3 (user mode or user level of processor privilege). In some embodiments, driver loader 46 loads and launches control driver 48 onto guest VM 32, driver 48 typically executing at the processor privilege level of guest OS 34 (e.g., ring 0, kernel mode). When control driver 48 finishes execution, loader 46 or app control engine 40 may remove driver 48 from guest VM 32, for instance by erasing a memory section containing driver 48. An alternative embodiment does not use driver loader 46, but instead injects code (e.g., control agent 42) directly into the kernel of guest OS 34. In such embodiments, control agent 42 may execute entirely in ring 0 (kernel mode).

Dropping a software component into a virtual machine may be achieved using various methods known in the art. FIG. 10 shows an exemplary sequence of steps performed by application control engine 40 to drop agent 42 inside guest VM 32 according to a preferred embodiment of the present invention. In a step 250, app control engine 40 identifies a section of memory suitable for injecting driver loader 46. In some embodiments, driver loader 46 is crafted to be as small as possible, e.g., much less than a memory page, so that it can be safely dissimulated among existing data structures without having to use the OS's memory allocation facilities (using these may make loader 46 and/or driver 48 discoverable by other software including malware executing within guest VM 32).

In one example, application control engine 40 may search for a memory section suitable to receive driver loader 46 within the padding space typically reserved by guest OS 34 between driver sections. Such padding space exists because some operating systems such as Windows® allocate memory such that each distinct section of an object is aligned to a page boundary. When a section does not occupy an entire memory page, the remaining memory space within the respective page is padded with dummy data (e.g., zeroes). In such embodiments, searching for a suitable memory space to accommodate driver loader 46 may comprise scanning a memory page allocated to a driver of guest OS 34 for such dummy data.

In another example, application control engine 40 may intercept an attempt by the OS to allocate memory for a small object (e.g., a driver), the respective object smaller than a memory page. Instead of allocating the required amount of memory, engine 40 may force guest OS 34 to allocate a full memory page (e.g., 4 kB) to the respective object, and use the remaining space within the respective memory page to host driver loader 46. To intercept such a memory allocation attempt, some embodiments of app control engine 40 and/or introspection engine 44 may detect an attempt to execute a native OS memory management function, such as KeAllocatePoolWithTag in Windows®. To determine memory addresses where such functions reside in the memory of the respective guest VM 32, application control engine 40 may access certain data structures, such as the exported functions tables of the kernel binary images (e.g. Portable Executable in Windows®, Executable and Linkable Format in Linux®). The type of object currently being allocated via may be determined according to the allocation tag of the intercepted call. For instance, in Windows®, a 'Driv' tag indicates a driver object.

In yet another example, step 250 comprises mapping an unused memory page to the memory space of an executing process, such as application 36 in FIG. 9. Having identified a suitable section of memory to host driver loader 46, in a step 252, application control engine 40 may inject loader 46 into the respective section of memory.

Next, some embodiments of application control engine 40 may wait for a trigger event to inject driver loader 46. An exemplary trigger event comprises a call to a particular function of guest OS 34. In a preferred embodiment, control engine 40 may wait for a currently executing process (such as application 36) to attempt a change of processor privilege, for example by issuing a system call such as SYSCALL on AMD® platforms, or SYSENTER on Intel® platforms. Intercepting a system call from outside the respective VM may be achieved in several ways. In one example, engine 40 may reset the value of a processor register of the virtual processor currently executing the thread attempting the system call. Examples of such processor registers include the IA32_LSTAR and IA32_SYSENTER_EIP registers on Intel® platforms. Such register manipulation will subsequently cause a fault when a system call is attempted; the respective fault may be detected by control engine 40 or introspection engine 44. In another example, engine 40 may place a redirection hook on the code page that contains a system call handler of guest OS 34.

In some embodiments, when a system call is intercepted, a step 256 carries out a set of eligibility checks, to determine whether the context of the respective system call allows for a safe injection of driver loader 46. In one example wherein interception of system calls is achieved via hooking of the system call handler, eligibility checks may comprise determining whether the current stack is a user stack or not. An attempt to inject code when the stack is a user stack may compromise the system, because anything that resides in user mode is untrusted for the kernel. In addition, other threads may sniff data from a user stack, and may even be able to attack driver loader 46. In some embodiments, determining whether the stack is a user stack comprises determining the privilege level of a stack segment descriptor. Another eligibility check may determine whether interrupts are currently enabled. Driver loader 46 may have to execute some processor instructions, which require interrupts to be enabled. Yet another eligibility check may determine the current interrupt request level (IRQL). Some embodiments may require, for instance, that the current IRQL be equal to 0 to be able to carry out the operations of driver loader 46.

When the system call meets eligibility requirements, in a step 260, app control engine 40 may suspend execution of the thread which issued the respective system call, and switch processor 16 to executing driver loader 46. When loader 46 has finished executing, control engine 40 may switch processor 16 back to executing the original thread (e.g., application 36).

FIG. 11 shows an exemplary sequence of steps performed by driver loader 46 according to some embodiments of the present invention. To allocate memory for control driver 48 and/or to create a thread for driver 48, some embodiments may call the dedicated functions of guest OS 34, for instance ExAllocatePoolWithTag and PsCreateSystemThread in Windows® (similar functions exist in other OSs, e.g. Linux®). In an embodiment wherein driver loader 46 is required to have a small memory footprint, the addresses of such OS functions may be provided to loader 46 by app control engine 40, e.g., via a messaging mechanism as described above. In such embodiments, driver loader 46 may not actually write control driver 48 to the allocated memory. Instead, loader 46 may communicate to application control engine 40 an address of the allocated section of memory, while the actual writing is carried out by control engine 40.

Once control driver 48 is launched (step 274), loader 46 may quit. In some embodiments, driver loader 46 may remove control driver 48 from guest VM 32 when driver 48 finishes execution, for instance, when driver 48 has finished harvesting data about a target process. In an alternative embodiment, app control engine 40 may perform the cleanup (e.g., remove driver 48 from memory).

Since control driver 48 executes within guest VM 32, having its own memory space and execution thread, driver 48 may use all resources available to guest OS 34 to harvest data. Control driver 48 may, for instance, enumerate a list of installed applications, determine various parameter values of the OS, determine timestamps associated with various software components, etc. Such tasks may be carried out using various methods known in the art. For instance, control driver 48 can enumerate certain registry keys of guest OS 34, the respective keys revealing the identity of an installed application/software package, etc. Another data harvesting method invokes an application programming interface (API) exposed by guest OS 34 (such as Windows Management Instrumentation—WMI in Windows®) to obtain various data about installed programs. In yet another example, driver 48 may search for specific files and folders (e.g., Program Files in Windows®) in order to obtain a list of installed programs and updates, to obtain access to a disk image of each program, etc. Such exemplary methods can be used independently or in combination.

While data harvesting proceeds, control engine 40 may exchange data (e.g., memory addresses, hashes, etc.) with app control agent 42. Such messaging between components executing within and outside a virtual machine may be carried out using any method known in the art of virtualization, for instance via a section of memory shared between control engine 40 and control agent 42, as described above.

The exemplary systems and methods described herein allow enforcing application control in a relatively large number of client systems (e.g., a corporate network). Exemplary application control comprises, for instance, preventing a client system from executing any software apart from a subset of allowed applications, or allowing the respective client system to execute any software except for a set of disallowed/prohibited applications. Application control may thus strengthen computer security, prevent unauthorized access and/or disclosure of proprietary/confidential corporate data, and increase employee productivity, among others.

Application control may be enforced according to a set of policies, which may indicate, for instance, which user/group of users may execute which software, on which computer systems, during which time intervals, on which parts of a computer network, etc. Application control policies may be conveniently centralized at a server communicatively coupled to the controlled client systems. Such centralization may allow a system administration to remotely apply control policies across a whole corporate network, or to swiftly operate user- or machine-specific changes to an existing control policy.

Some embodiments use hardware virtualization technology to increase the safety and reliability of the application control. To avoid exposing application control software to human manipulation and/or to malware infecting the controlled client machine, some embodiments move client software including the operating system to a virtual machine (VM), and perform at least a part of the application control activities from outside the respected virtual machine. Some application control software may thus execute at the level of a hypervisor, or within a separate, dedicated control VM executing on the respective client. By taking full advantage of virtualization, some embodiments of the present invention are also well-suited for enforcing application control in client systems which execute multiple VMs in parallel, such as server farms and virtual desktop infrastructure (VDI) systems. A single application control engine configured according to some embodiments may control a plurality of VMs, or even all VMs executing on the respective client.

Application control software may detect an attempt to set up, launch and/or execute a new process within the controlled VM. In a preferred embodiment of the present invention, such detection comprises detecting an attempt by the operating system to set up a virtual memory space for the respective process. In response to detecting the attempted launch/execution of the respective process, application control software may determine whether execution of the respective process is allowed according to control policies, and when yes, may allow the execution to proceed. When current policies prohibit execution of the respective process, some embodiments may stop execution of the respective process, notify the respective user and/or a system administrator or remote control server.

Having application control software permanently installed within a client machine may expose such application control software to malware, which may stop or otherwise incapacitate it. In contrast to such conventional solutions, some embodiments of the present invention drop a temporary control agent into the guest machine for data harvesting or other application control purposes. Temporary agents configured according to some embodiments are difficult for malicious software to detect, which reduces the respective computer security risk. Another advantage of using non-permanent agents is that such configurations may significantly facilitate administration, deployment, and upgrade of both virtual machines and application control software. When the application control solution is independent and not permanently tied to the controlled virtual machine, the respective application control software may be updated independently of VM software. For instance, updates to application control engine(s) 40*a-b* may be installed without affecting the operation of guest VMs executing on the respective client. In many modern applications of hardware virtualization, such as VDI, virtual machines are typically instantiated and removed dynamically on the client system, often based on a VM image stored locally on the client or received from a VDI server computer. When the controlled VM does not have a permanent app control agent installed, the VM image may be updated or otherwise changed at any time without affecting the application control software.

Carrying out application control tasks from a position outside a client VM however poses a difficult technical problem, commonly known in the art as "bridging the semantic gap". While software executing within the respective VM has access to a wealth of information relevant to application control, software executing outside the respective VM typically only has access to the content of the physical memory of the respective client computer system, and to the current state of the virtual processor of the respective VM. Therefore, untangling the semantics of in-VM software from outside the respective VM may be impossible, or at best may require substantial amounts of computation. Dropping the application control agent into the controlled VM may help bridge said semantic gap, by gathering information from within the client VM and communicating such information to components executing outside the respective VM.

It will be clear to a skilled artisan that the above embodiments may be altered in many ways without departing from the scope of the invention. Accordingly, the scope of the invention should be determined by the following claims and their legal equivalents.

What is claimed is:

1. A computer system comprising at least one hardware processor configured to execute a set of guest virtual machines (VM) and to further execute an application control engine, the application control engine executing outside the set of guest VMs, the application control engine configured to:
    detect an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process;
    in response to detecting the event, determine according to an application control policy whether the target process is allowed to execute on the computer system, wherein the application control policy maps allowed processes to users of the computer system; and
    in response to determining whether the target process is allowed to execute, when the target process is not allowed to execute, prevent an execution of the target process.

2. The computer system of claim 1, wherein the event comprises writing to the data structure.

3. The computer system of claim 1, wherein detecting the event comprises detecting an attempt to write to a control register of the at least one hardware processor, the control register configured to store a pointer to the data structure.

4. The computer system of claim 1, wherein the application control engine is further configured to maintain a list of processes executing within the guest VM, and wherein detecting the event comprises determining according to a value read from a control register of the at least one hardware processor whether the target process is on the list of processes.

5. The computer system of claim 1, wherein the application control engine is further configured, in response to detecting the event, to identify the target process according to a set of identifying features of the target process, and wherein identifying the target process comprises:
    in response to detecting the event, inserting a control agent into the guest VM, the control agent configured to determine the identifying features; and
    in response to the control agent determining the identifying features, removing the control agent from the guest VM.

6. The computer system of claim 1, wherein inserting the control agent comprises:
    writing a driver loader to a memory of the computer system, the driver loader configured to load a control driver into the guest VM, the control driver configured to determine the identifying features; and
    configuring the target VM to switch, when a computer program executing within the guest VM issues a system call, from executing the computer program to executing the driver loader.

7. The computer system of claim 1, wherein preventing the execution of the target process comprises changing a value of an instruction pointer of the at least one hardware processor, to alter an execution flow of the target process.

8. The computer system of claim 1, wherein determining whether the target process is allowed to execute on the computer system comprises:
    transmitting an indicator of the target process to a remote server computer system; and
    in response, receiving from the server computer system a policy indicator indicating whether the target process is allowed to execute on the computer system.

9. A method comprising employing at least one hardware processor of a client system to execute an application control engine outside of a set of guest virtual machines (VM) exposed on the client system, wherein executing the application control engine comprises:
    detecting an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process;
    in response to detecting the event, determining according to an application control policy whether the target process is allowed to execute on the client system, wherein the application control policy maps allowed processes to users of the client system; and
    in response to determining whether the target process is allowed to execute, when the target process is not allowed to execute, preventing an execution of the target process.

10. The method of claim 9, wherein the event comprises writing to the data structure.

11. The method of claim 9, wherein detecting the event comprises detecting an attempt to write to a control register of the at least one hardware processor, the control register configured to store a pointer to the data structure.

12. The method of claim 9, wherein the application control engine is configured to maintain a list of processes executing within the guest VM, and wherein detecting the event comprises determining according to a value read from a control register of the at least one hardware processor whether the target process is on the list of processes.

13. The method of claim 9, wherein executing the application control engine further comprises, in response to detecting the event, identifying the target process according to a set of identifying features of the target process, and wherein identifying the target process comprises:
    in response to detecting the event, inserting a control agent into the guest VM, the control agent configured to determine the identifying features; and
    in response to the control agent completing the determination of the identifying features, removing the control agent from the guest VM.

14. The method of claim 13, wherein inserting the control agent comprises:
    writing a driver loader to a memory of the computer system, the driver loader configured to load a control driver into the guest VM, the control driver configured to determine the identifying features; and configuring the target VM to switch, when a computer program executing within the guest VM issues a system call, from executing the computer program to executing the driver loader.

15. The method of claim 9, wherein preventing the execution of the target process comprises changing a value of an instruction pointer of the at least one hardware processor, to alter an execution flow of the target process.

16. The method of claim 9, wherein determining whether the target process is allowed to execute on the client system comprises:

transmitting an indicator of the target process to a remote server computer system; and in response, receiving the application control policy from the server computer system, the application control policy determined by the server computer system according to the indicator of the target process.

17. A non-transitory computer-readable medium storing instructions which, when executed by at least one hardware processor of a computer system configured to execute a set of guest virtual machines (VM), cause the computer system to execute an application control engine, the application control engine executing outside the set of guest VMs, the application control engine configured to:

detect an event indicative of a launch of a target process within a guest VM of the set of guest VMs, wherein the event comprises an item selected from a group consisting of setting up a virtual memory space for the target process, and writing to a data structure used by the at least one hardware processor to perform memory address translations for the target process;

in response to detecting the event, determine according to an application control policy whether the target process is allowed to execute on the computer system, wherein the application control policy maps allowed processes to users of the computer system; and in response to determining whether the target process is allowed to execute, when the target process is not allowed to execute, prevent an execution of the target process.

* * * * *